Dec. 6, 1960 L. W. BEAVEN 2,963,705
SINGLE OR MULTIPLE ROW TWO CYCLE ROTARY RADIAL ENGINE
WITH FUEL INJECTION AND SIMPLIFIED IGNITION
Filed Dec. 18, 1957 3 Sheets-Sheet 1
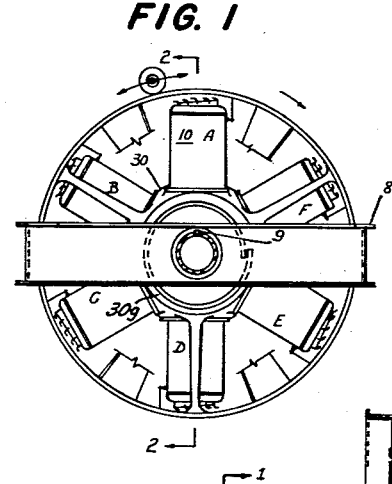
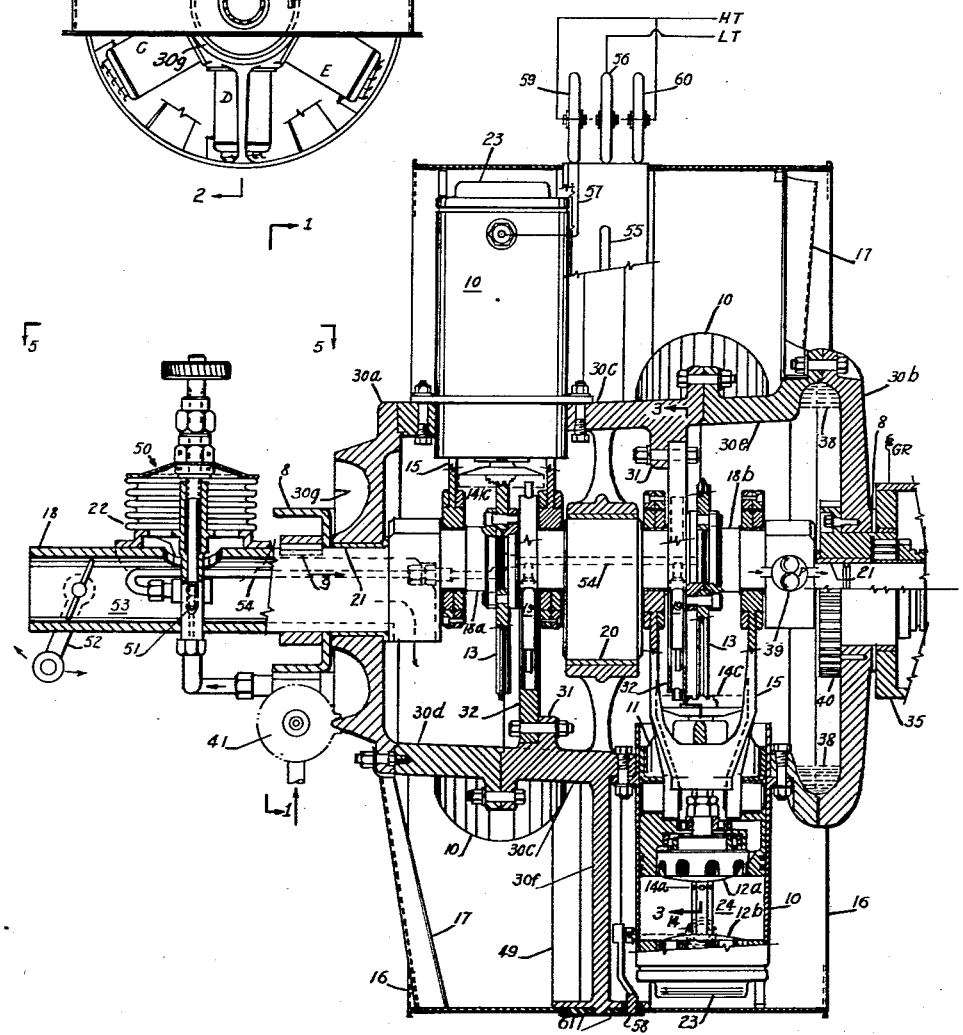
Leslie W. Beaven
INVENTOR Dec. 6, 1960   L. W. BEAVEN   2,963,705
SINGLE OR MULTIPLE ROW TWO CYCLE ROTARY RADIAL ENGINE
WITH FUEL INJECTION AND SIMPLIFIED IGNITION
Filed Dec. 18, 1957   3 Sheets-Sheet 2
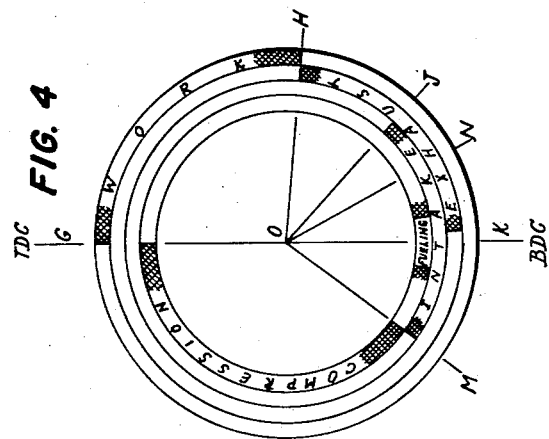
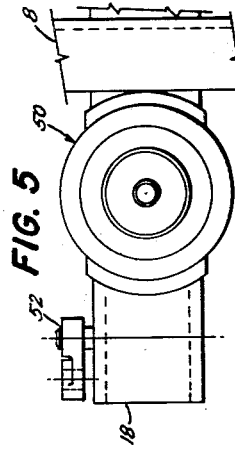
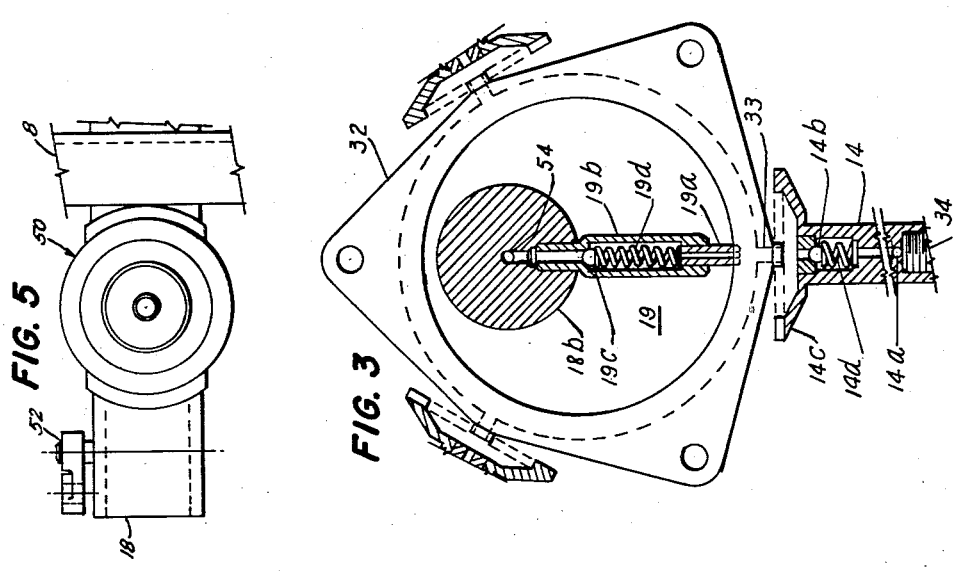
Leslie W. Beaven
INVENTOR

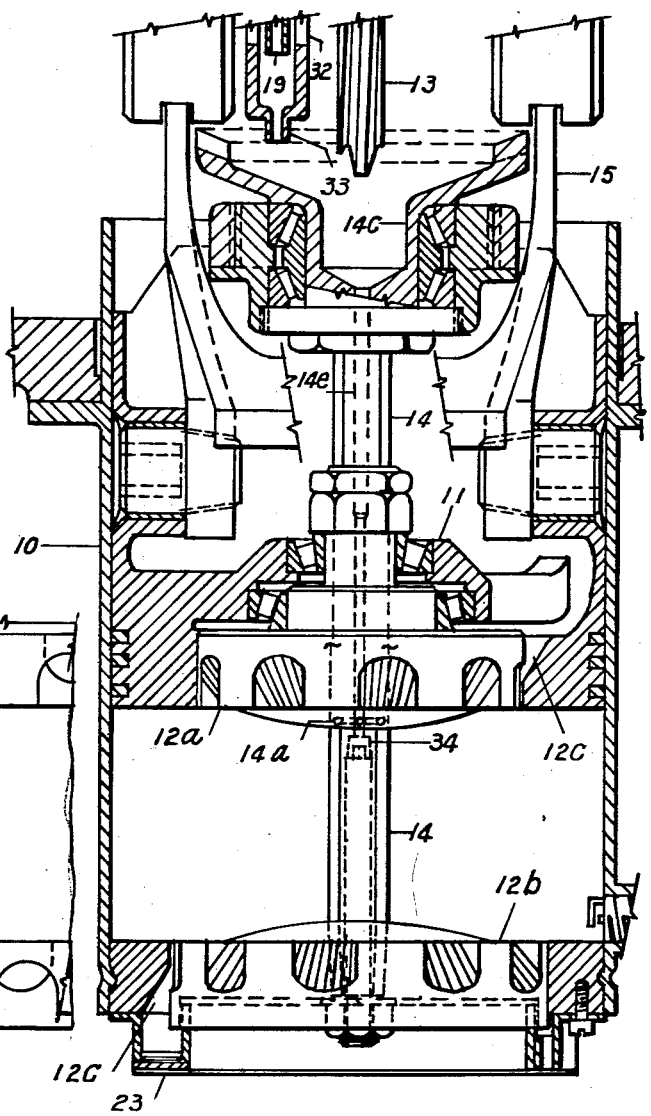
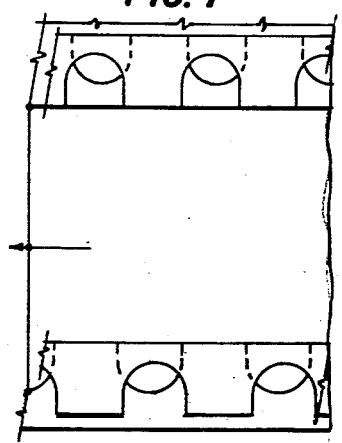
FIG. 6
FIG. 7

United States Patent Office 2,963,705
Patented Dec. 6, 1960

2,963,705

SINGLE OR MULTIPLE ROW TWO CYCLE ROTARY RADIAL ENGINE WITH FUEL INJECTION AND SIMPLIFIED IGNITION

Leslie W. Beaven, 44 E. Washington St., Palatine, Ill.

Filed Dec. 18, 1957, Ser. No. 703,603

14 Claims. (Cl. 60—39.34)

This invention relates to improvements in engines of the rotary radial type which employ both the expansion and the reaction principles, with hydrocarbon fuels, for use in automobiles, planes, portable tools and the like, where economy of weight and fuel are important.

More particularly, my invention concerns a two row arrangement of cylinders in a rotary radial type engine. Any given horsepower can be achieved with a smaller circular cross-section with two rows of cylinders than with one. But my invention also applies to engines of one row and to engines of many rows.

For a number of years I have advocated rotary radials which were self-supercharging, taking a fuel and air mixture thru a hollow crankshaft into a spinning crankcase which carried the cylinders, the mixture passing axially thru valved pistons into the firing chambers. The burned gases were directed thru exhaust valves and then turned tangentially for contra-spinwise discharge from the cylinder ends, pinwheel fashion, for supplemental reaction power. In this connection, reference is directed to my earlier U.S. Patents 2,512,909, and 2,795,216, and my copending applications Serial No. 645,224 and Serial No. 645,225 filed March 11, 1957.

I have now found a way of injecting the fuel directly into the firing chambers, thus separating the fuel from the air and thereby eliminating the danger of combustion in the crankcase or dilution of the lubricant and this step of progress leads to another.

These rotary engines abolish reciprocation of pistons. The pistons spin on the crankpins while the cylinders spin on the mains. They, therefore, may be run at turbine speeds which render them capable of pumping pure intake air into the firing chambers under a pressure of half atmospheric or more.

There is a well known line of reciprocators known as General Motors two-cycle diesels in which a Roots blower furnishes a blast of fresh air for scavenging the cylinders of burned gases. This removes a major fault of the two-cycle type of engine. The two-cycle engines have the advantage of better distribution of torque because they fire every revolution, and they require considerably fewer parts. As described in greater detail below, I have devised an arrangement for radial flow of pressurized fresh air for scavenging the cylinders, by merely setting the valves so that the intake valve and the exhaust valve will be open at the same time for a suitable interval during the exhaust function. No Roots or other type blower is needed. No additional ports or flow passages are needed. No additional parts are needed. The flow travel in my engine, already at a geometric minimum because it is radial, remains at geometric minimum, which is another improvement over such engines as the two-cycle diesel referred to, and in addition my engine has two sources of power as stated in paragraph one.

But there is still another advantage. The means for injection of the fuel directly into the firing chambers requires a special type of crankshaft and a special type of crankcase which lends itself favorably to the simplification of the ignition system, if it happens to be electric, and to more certain setting and timing thru speed changes. This latter is only schematically shown. But the simplification of the wiring and setting, and the combination with fuel feed, are shown in some detail.

An engine of two rows of 3 cylinders each, suffices to describe the arrangement. They are symmetrically staggered as to arc of rotation. The crankpins of the two rows are in axial alignment.

The common crankpin axis permits a single commutator, common to each pair of rows for switching the ignition current from a single brush position. If multiple pairs of rows are desired, then a common axis for all crankpins and another common axis for all brush positions, admits of a single mechanism, responsive to speed and load variations of advanced and retarded spark, for consecutive timing of all of the cylinders. The "one timer" idea is not new but the elimination of the "birds' nest" of wires is new and highly beneficial in a number of ways.

In this instance the electrical mechanism for 2 rows comprises a rim commutator with take-off brushes or roller contactors for circuit make and break. These contactors have a fixed position for every different speed within the small angular range, commonly known as advanced and retarded spark. This means that all the cylinders can come to one general firing position as they rotate, even though three of them are in the front row and three in the rear. The single commutator and brush assembly is common to both rows. It will serve one row and it is common to all rows, no matter how many are used.

Short leads of bare conductor wire suffice from the commutator segments to the spark plugs which with multi-cylinder engines ordinarily require heavy insulated high tension wires running all over the engine.

Where the speed and the number of cylinders are not too great, only two wires lead to the roller contactors and one to the ground on the transmission or frame.

Thus I now have outlined a two row, two-cycle, rotary radial engine employing both the expansion and the reaction principles, for hydrocarbon fuels, and I have described how the number of cylinders can be increased for consecutive firing of the cylinders with multiple pairs of rows, by keeping a common axis for the crankpins and another common axis for the brush positions, where great horsepower is desired. Conversely, where small power is desired, the number of cylinders can be reduced even to "two in one row" or to two rows of one each, by the simple expedient of omitting either cylinders or rows or both.

It is accordingly the principal object of this invention to provide an improved engine of the rotary radial type which is scavenged by a self-induced and pressurized blast of air without auxiliary equipment, flow travel or stroke.

Another object of this invention resides in the provision in such an engine of an improved fuel feed arrangement which eliminates the hazard of combustion in the crankcase and dilution of the engine lubricant.

Still another object of the invention resides in the provision in such an engine of a greatly improved ignition system which substantially simplifies the requisite engine.

These and additional objects and features will become more readily apparent as the following more detailed description proceeds, taken in conjunction with the accompanying drawings in which:

Fig. 1 is a sectional view of the front end of the engine proper, showing the supporting channel iron frame and the arrangement of cylinders which are lettered in their firing order, viz. A, B, C, D, E and F. Cylinders A, C and E are in the front row and B, D and F are in the back row. The section is taken on the line 1—1 shown in Fig. 2 and cuts thru the hollow end of the crankshaft. The engine frame is shown keyed to the crankshaft and carries the transmission also, and these comprise the stator of the engine. The cylinder-crankcase assembly is the rotor.

Fig. 2 is an enlarged longitudinal section taken as shown along line 2—2 in Fig. 1, with parts and insignificant detail omitted for simplicity.

Fig. 3 is a sectional view taken along line 3—3 in Fig. 2, showing a fuel trough, the crankpin, a fuel quill, and the three valve drivers.

Fig. 4 illustrates in graph form the timing cycle of this engine. The positions are purely relative. The degrees of angle are not shown. In practice the dead-center line is not necessarily vertical.

Fig. 5 is a plan view of the fuel feeding regulator illustrating that the bellows are circular in plan.

Fig. 6 is a sectional view thru a cylinder to show the valving arrangement in general and taken during the scavenging function when the cylinder axis is approximately at the position shown by the ray O—N in Fig. 4 where both valves are open and the fuel feeding holes in the valve driver shaft are not yet uncovered by the piston. The relative diameter of the cylinder has been increased somewhat in order to permit a more detailed showing of the fuel flow path and the rotary valve ports.

Fig. 7 is a developed view of the valve port contours, projected from Fig. 6 and laid out flat, showing the matching relationships of the intake and exhaust rotor notches and the notches in their corresponding stators, to form the ports as well as the relationship of the exhaust and intake functions, at the time of the scavenging air blast, right thru the firing chamber, the time being substantially as indicated by the ray O—N in Fig. 4. The rotors are joined by the vertical line and move leftward together as indicated by the arrow. The view is taken looking inward thru the contours of the stators.

Referring now more specifically to Fig. 1, numeral 8 designates the engine frame which is secured by key 9 to the crankshaft 18.

The cylinders 10 and labelled A, B, C, D, E and F, the pistons 11, the intake and exhaust valves 12a and 12b, and their ports 12c, valve means comprising worm plate 13 and valve driver shaft assembly 14, with its small fuel feed holes 14a in the shank which are uncovered by the piston, acting as a valve element, to form a feed and no feed fuel jet valve, as the piston approaches bottom dead center (BDC in Fig. 4), and the fuel channel 14e, connecting rods 15 and cooling means comprising tubular shroud 16 and fan blades 17, are the same elements shown and described in copending application, Serial No. 645,224 filed March 11, 1957, and of which application this application is a continuation in part. The connecting rods 15 have segmented bearing ends at the crankpin ends that assemble into a ring.

The three-piece crankshaft 18, joined by flange connections, has a center main bearing 20, two end bearings 21, two crank throws 18a and 18b on the same axial alignment, an aperture 22 for the fuel feed device and channels 54 for the fuel flow, ending in two downward discharging quills 19, whose lower ends have replaceable jets 19a (Fig. 3), one quill for each row of cylinders. These jets, as is common practice in the feeding of fuel, have a predetermined calibre orifice for precision metering and can be replaced when worn to oversize. Above each jet is a spring loaded ball check valve 19b (Fig. 3). The check valve prevents variation in the fuel feed and it holds the channel in the crankcase full, thereby limiting dribble to a nominal amount. The ball valve is pushed open by the fuel pressure.

The crankcase assembly 30 is special, having bosses 31 on which to mount two fuel troughs 32 (one for each row of cylinders). One is illustrated in Fig. 3, showing its three outlets 33, one to each valve driver shaft for delivering the fuel into the flared end gear of the shaft.

The valve driver shafts 14 are special, being hollow for passage of fuel, and flared out at the fuel receiving end to form both a gearhead 14c and to act as a funnel, all shown in Fig. 3. Its hollow stem or shank has small lateral holes 14a at the outer end which are uncovered by the piston as it nears bottom dead center (BDC) Fig. 4, to let the fuel into the firing chamber 24, shown in Fig. 2.

The outward end of the stem carries the exhaust valve 12b and is closed with a plug 34, Fig. 3, and which is removable for clean-out purposes.

The gear end of each driver shaft also has a spring-loaded valve 14b illustrated as ball type for simplicity of illustration. One is shown in Fig. 3 just below the driver gear. The spring is only strong enough to hold the ball seated when the engine is not running and will prevent the fuel from leaking back and diluting the lubricant when the engine is stopped. The check is opened by centrifugal force when the motor is running.

The crankcase assembly 30 comprises two end sections, that on the front, 30a, carrying a spiral track 30g for driving the fuel pump, and that on the rear 30b, having provision to partly form the oil sump 38. The center section 30c carries the center main bearing and has half-recesses for both rows of cylinders and is spoked at 30f to carry a commutator-like ring 49 with its electrodes and its insulated surfaces, and also to support the cylindrical shrouds 16, front and rear, to contain the coolant air currents and to help support the fan blades 17.

Then there is a front intermediate section 30d and a rear intermediate section 30e, each with the remaining half-recesses for the cylinders and otherwise adapted to complete the crankcase. The assembled crankcase 30 forms a tapered internal hollow for aiding the return of the lubricant to the sump 38 and the pump 39.

The spokes 30f, or similar means, for supporting the "commutator" could as well proceed from another one of the sections or from more than one, to avoid breakage by internal stresses or by vibration, or to alter the location of the "commutator."

The oil pump, scoop and flow channels are not shown but the position for the pump is shown by a pump symbol on the crankshaft, and the oil pump driver gear 40 is shown. These are shown and described in detail in the prior application aforesaid, Serial No. 645,224.

The fuel pump 41 shown, and its driving spiral means 30g, need not be special. They need only provide pressurized fuel, the pressure being related to speed and with an adjustable by-pass so that pressure limits can be suitably regulated.

The fuel feed device assembly 50 is essentially an elastic bellows mounted rigidly at its bottom to the engine shaft on the hollow intake end. An adjustable needle valve 51 is provided for fuel flow setting. The position of the throttle valve 52 ahead of the bellows makes the latter sensitive to the absolute pressure under the bellows in the air intake passage 53 and varies the fuel feed in proportion to the density of said air.

The stiffness of the bellows is made to suit the requirements of the engine, or may be supplemented by adjustable springs (not shown).

The transmission 35, if selectively geared, should preferably have a fluid drive unit interposed between it and the engine to limit the torque load, which if excessive tends to overload the expansion function and underload the reaction function with a consequent loss of efficiency. Illustration of such a transmission has been omitted for simplicity, as this is now a common practice.

The engine is cranked in any manner desired until it is primed, and according to Fig. 1, cylinder A arrives at top dead center, TDC (Fig. 4) and fires. It starts on its work cycle, during which cylinder B arrives after 60° of engine turn, bringing up cylinder C next, then D, E and F in turn, and each at 60° displacement to complete one revolution of engine. This will have carried cylinder A thru its work stroke, G to H (Fig. 4), its exhausting H to K, its fueling near BDC, its compressing M to G, and it then arrives at TDC for its second revolution. Each cylinder does likewise, each doing its share toward motivation, and the process would be similar no matter how many cylinders are put in the paired rows, or the number of paired rows.

Note, in Fig. 4, that from J to K, both the exhaust and the intake valves are open. The pressure in the firing chamber 24, having fallen low at J because the exhaust valve 12b is full open, is then overcome by the pressure of the fresh air that is packed with centrifugal force against the inward side of a piston 11 until the intake valve 12a in that piston opens, whereupon a blast of fresh air blows right thru the firing chamber, whisking out all the gaseous products of combustion, leaving the cylinder full of fresh air as the exhaust valve closes. The peak of this scavenging operation is intended to occur at a point between "J" and "K" in Fig. 4, as for example point "N." But the intake valve continues to pack it in until it closes in turn.

For a more detailed description of the pistons 11 and the valves 12a and 12b, reference may be had to U.S. Patent No. 2,795,216, issued to me June 11, 1957.

The over-ride, past bottom dead center (BDC), of the intake cycle simply makes use of the inertia velocity of the fast moving gases. A slight over-ride is also seen in the exhaust cycle over the fueling cycle. This follows the general practice, based on experience in the art. It prolongs the useful parts of the cycle, since at the cycle ends, the valves are practically ineffectual.

Meanwhile fresh air has been flowing into the inlet end 53 of the crankshaft 18, in accordance with the setting of the throttle 52, to control the power demand, turning into the crankcase 30 as indicated by bent arrow, Fig. 2 and radially thru the pistons 11, and into the firing chamber 24 and out thru the exhaust valves 12b, turning contra-spinwise in the exhaust bonnet 23 for jet reaction, all as described in copending applications Serial No. 645,224 and Serial No. 645,225, filed March 11, 1957.

If the throttle is wide open, the pressure drop across the throttle is near zero and the bellows of the fuel feed device 50 takes its upper setting, having a normal tendency toward its longest vertical dimension. This carries the needle valve 51, which is screwed into the bellows head, to its most open position corresponding with maximum air. If the throttle then is suddenly closed and the momentum of the engine and load maintains its high speed, the throttle blocks the entrance of air and the pressure drop across the throttle approaches maximum, pulling the bellows and the needle valve down and reducing the rate of fuel flow thru the needle valve aperture.

Proper adjustment, tensions in the bellows and resistance to fluid flows, of fuel and of air makes it possible to preserve the correct proportions of fuel and air in the firing chambers of the cylinders throughout the main variations of load. The metering of fuel at needle valve 51 controls the feed at the end of the quills assembly 19 with the precision jets 19a which vary the feed with the pressure in channels 54. The jet is assembled into the check valve housing 19b, 19c is the ball check and 19d is the spring which holds the ball to its seat to prevent dribble from channel 54, when the engine is stopped. The flow is along the tube 54, the continuing drilled channels in the crankshaft assembly 18 to the jets 19a, which then discharge into the circular troughs 32. The jets are stationary, being affixed to the crankshaft 18. The troughs revolve with the cylinders, in a plane perpendicular to the centerline of the engine. The cross-section of the troughs is cuplike and is always in position to catch the discharge from the jets 19a. The troughs have three short tube outlets 33, one to each cylinder, which discharge immediately because of the centrifugal force on the fuel, thru the said outlet which is directed into the flared end of the toothed gear 14c of the valve driver shaft 14, and under the combination of centrifugal force and gravity the fuel is either imposed upon prior fuel all ready to dart thru the fuel feed holes 14a in the hollow valve driver shaft assembly 14, as the piston 11 approaches its bottom dead center, BDC, or goes direct. 14b is the ball check, 14d is its spring.

The functioning of the ignition can be followed in Fig. 2. As before stated, the center section of the crankcase 30c is shown spoked as at 30f, to carry a rim commutator 49. Part of its outer surface is covered with an insulated surface 61, thru which the rim metal projects, in a track electrode 55, at three chosen arcs on centerline for grounding the primary current, using the engine for a conductor, for make, at the track's beginning and break at its ending. This rim metal may be faced or pointed up with special metal to insure against burning.

The individual high tension commutator conductors, six in number, are permanently connected to their adjacent sparkplugs and are insulated from the engine by dielectric. Those on the left side of the rim commutator 49, numbered 57, are connected to the front row plugs, and those on the right 58 to the back row plugs. The ground connections are made and broken with the wheel contactor 56, being in the drawings here, the middle wheel and carrying low tension LT current. The two outside wheels 59 left, and 60 right, carry high tension HT current, coming from the secondary of the coil, and they ride on insulated surface until the primary is broken and the field in the coil collapses, sending a surge of HT current to both wheels, one of which is then riding the insulated conductor 57 for the front row; the other, 60, for the back row, not being due for circuit, rides insulated. The conductors are permanently connected by short bare wires to their respective sparkplugs. When the left wheel 59 is on the conductor 57, the right wheel is on insulation and the spark current goes only to the front row cylinder 10A at that moment. When cylinder 10B is up for firing, the right hand wheel will be on the B cylinder electrode 58 and the left hand wheel will be insulated, so the current goes only to the sparkplug of cylinder B.

The single mechanism, responsive to speed and load variations of the engine, referred to on column 2, lines 12–39 of this application, whose function it is to advance or retard the spark by moving the common axis of the contactor wheels 56, 59 and 60 and their counterparts, if other pairs of rows of cylinders are added, has not been shown. It has been found that this is a very difficult function to perform accurately and that such accuracy is highly important to efficiency of the engine in order that the maximum pressure of the exploding gases shall occur at top dead center, TDC, and not before or after, in spite of changes in engine speed and load.

A ground wire (GR) is shown on the transmission. The hand switch, the battery, and the ignition coil (not shown) are interposed in circuit between the open wire ends according to standard procedure. The rim 49 of the central crankcase section also functions to support the front and rear coolant air shrouds 16 on each side thereof at their intermediate ends and the cylinders and fan blades serve to support their extreme ends.

In review, therefore, whereas four-cycle engines are scavenged by a stroke of the piston, this two-cycle engine is scavenged by a blast of fresh air, pressurized without additional apparatus, flow travel or stroke.

The fuel feed arrangement eliminates the fire hazard and dilution of lubricant or the need of special lubricant.

The ignition arrangement greatly simplifies the problem of wiring and of engine repairs. There is no puzzling firing order. If more rows of cylinders are added, all the interval angles between firings must be changed since the intervals must be uniform. The cylinders always approach the firing line in files, but there is never more than one cylinder in rank. The firing interval is always 360° divided by the total number of cylinders.

The combination paves the way for adding cylinders for enormous horsepower, per engine.

It will be apparent to those skilled in the art from a reading of the foregoing that modifications and revisions will be suggested, and all such modifications and revisions as come within the spirit of this invention are intended as falling within its scope as best defined in the appended claims.

Having described my invention in detail, what I desire to have protected by Letters Patent of the United States is:

1. In an internal combustion piston engine wherein the crankshaft is the stator and the crankcase and one or more rows of cylinders and pistons revolve as the rotor about the crankshaft and wherein one end of the crankshaft is hollow communicating the interior of the crankcase to atmosphere, at least one crankpin on said crankshaft, the improvement comprising a fuel distributing quill extending from said crankpin in line with the row of cylinders which it serves, a fuel pump, conduit means extending from said fuel pump thru said hollow crankshaft and crankpin communicating with said fuel distributing quill, and means operable in timed relation to the rotation of the engine for sequentially injecting fuel from said quill into the cylinders.

2. An internal combustion piston engine as claimed in claim 1, in which said means includes a hollow valve driver shaft on which each piston is slidable, the inner ends of which shafts are provided with a flared gear adapted to receive fuel from a trough, the trough supplied from the quill in a predetermined rotational position of the cylinders in line with said quill, and apertures in said shafts near the other ends for distribution of fuel into the cylinders at predetermined times.

3. An internal combustion piston engine as claimed in claim 1, in which said quill is provided with a metered orifice jet and a check valve operable in response to fuel pressure to release fuel from the quill into the flared ends of the valve driver shafts at predetermined times.

4. An internal combustion piston engine as claimed in claim 2, including a check valve in each hollow valve driver shaft normally open in response to rotation of the cylinders about the crankpin.

5. An internal combustion piston engine as claimed in claim 3, including a removable plug in the outer ends of said valve driver shafts for access to the fuel metering jets of said quills.

6. In an internal combustion piston engine of the type wherein the crankshaft is the stator and the crankcase and one or more rows of cylinders and pistons revolve as the rotor about the crankshaft and wherein one end of the crankshaft is hollow communicating the interior of the crankcase to atmosphere for air intake and centrifugal compression, at least one crankpin on said crankshaft, rotary valves in each piston and cylinder head rotatable in timed relation to the rotation of the engine to open and close ports for air intake, the improvement comprising, a fuel distributing quill extending from said crankpin in line with the row of cylinders which it serves, a fuel pump, conduit means extending from said fuel pump thru said hollow crankshaft and crankpin communicating with said fuel distributing quill, a hollow valve driver shaft on which each piston is slidable, the inner ends of which shafts being provided with a flared gear adapted to receive fuel from the quill in a predetermined rotational position of the cylinders in line with said quill, said shafts being provided with apertures near the other ends for distribution of fuel into the firing chambers of the said cylinders at predetermined times, cylinder scavenging and exhaust separate from the injection of fuel into the cylinders, said rotary valves being adapted to be simultaneously open toward the latter part of the exhaust cycle and effectively prior to the fuel injection cycle so that each cylinder is scavenged by pressurized fresh air induced thru the hollow crankshaft and crankcase and the fuel injection is maintained separate from the induced air in the crankcase.

7. In an internal combustion piston engine of the type wherein the crankshaft is the stator and the crankcase and paired rows of spark-plugged cylinders and pistons revolve as the rotor about the crankshaft and wherein one end of the crankshaft is hollow communicating the interior of the crankcase with the atmosphere for air intake, the improvement comprising a plurality of crankpins, all in axial alignment on said crankshaft, and a simplified ignition system for each of the cylinders comprising a commutator common to each pair of rows of cylinders, said commutator being in the form of a rim of insulated material, non-insulated metal track electrodes projecting thru said rim at arcuate positions corresponding to the number of cylinders in each row, insulated high tension metal commutator conductors projecting thru said rim on either side of said non-insulated track electrodes individually connected to the spark-plugs of the cylinders, and a plurality of contactors adapted to engage each of the rows of commutator conductors and the track electrode for switching high tension current sequentially to the cylinders in accordance with a predetermined firing order.

8. An internal combustion piston engine as claimed in claim 7, including a plurality of sets of said contactors, one set for each commutator common to each pair of rows of cylinders, said sets of contactors having a common axis.

9. An internal combustion piston engine as claimed in claim 7, in which said non-insulated track electrode makes the engine a conductor for grounding the primary current, make being at the track's beginning and break at its ending, said high voltage contactors being in engagement with the respective commutator conductors as the ground potential contactor collapses the field of the coil feeding the high voltage contactors.

10. In an internal combustion engine of the expansion-reaction type, the stator embodying the crankshaft, and the rotor embodying the crankcase and one or more rows of cylinders with their pistons and connecting rods, the rotor journaled to rotate about the crankshaft, the crankshaft embodying at least one crankpin, one end of the crankshaft made hollow thus providing communication of the interior of the crankcase to atmosphere for air intake and simultaneously subjecting the intake air therein to centrifugal compression, rotary valves in each piston and cylinder head, a firing chamber between, said valves rotatable in timed relation to the rotation of the engine to open and close ports to cycle the engine, means for driving said valve rotors, said means embodying a funnel shaped gear and a shaft common to both valve rotors, a fuel pump to supply the fuel, the improvement comprising: a fuel distributing quill extending from said crankpin and substantially in line with the row of cylinders which it serves, conduit means from said fuel pump thru said crankshaft, said conduit communicating with said fuel distributing quill, a fuel duct in the valve driver shaft, the duct communicating the funnel shaped gear with the firing chamber for the passage of fuel thereto, means for cyclically closing and opening the said fuel duct to control the admission of fuel to the firing chamber, and means for conveying the fuel from the fuel quill to the funnel shaped gear.

11. In a rotary internal combustion engine of the expansion-reaction type wherein the stator embodies a static crankshaft and the rotor embodies a crankcase journaled for rotation on said crankshaft, cylinder-piston means comprising the expansion means and exhaust means comprising the reaction means, a cylinder of said cylinder-piston means mounted to said crankcase, an air intake duct connecting the interior of said crankcase with the atmosphere for fresh air intake, an exhaust orifice on said cylinder for jetting the burned gases contra-spinwise back to atmosphere, centrifugal compression of said fresh intake air in said crankcase, a passageway from the interior of said crankcase to said exhaust orifice for the flow of the gases thru said cylinder, a firing chamber in said cylinder, rotary intake and exhaust valves for cycling said firing chamber in two-cycle timed relation with said cylinder-piston means, said firing chamber located between said valves, a fuel distributing quill extending from said crankshaft in line with the rotational path of said cylinder, means for supplying fuel to and thru said quill, a spring loaded check valve in said quill for preventing dribble of the fuel when the engine is not operating, means for conducting fuel from said quill to said firing chamber in ignitive seclusion from said fresh intake air, means for alternately passing and stopping said fuel in sequentially timed relation with the cycles of said firing chamber and means responsive to pressure difference from inside to outside of said air intake duct for metering said fuel in combustive relationship to the fresh air entering said crankcase.

12. In an internal combustion engine as set forth in claim 11, the means for conducting fuel to said firing chamber in ignitive seclusion from said fresh intake air comprising, a driven fuel pump, a channel from said pump to a fuel feed device for metering said fuel, a channel from said device to said quill, an annular trough aligned with said quill, to catch said fuel from said quill, said trough affixed to said engine rotor, said trough having a short tube outlet therefrom, a hollow valve driver shaft assembly, said hollow thereof having its inlet end flared to catch said fuel from said outlet tube, said tube being directed to deliver said fuel into said flared hollow, the opposite end of said hollow terminating in a transverse duct thru the wall of said hollow shaft, said duct directed to discharge into said firing chamber.

13. In an internal combustion engine as set forth in claim 11, said means for alternately passing and stopping said fuel in sequence and in timed relation with the cycles of said firing chamber comprising, a feed and no feed fuel jet valve, the valve elements comprising said piston, said valve driver shaft, and said transverse duct thru said wall of said hollow valve driver shaft, said shaft passing axially thru said piston, said piston made longitudinally slideable on said shaft to sequentially cover and uncover said transverse duct.

14. In an internal combustion engine as set forth in claim 11, the means responsive to pressure difference from inside to outside of said fresh air intake duct for metering said fuel in combustive relationship to the fresh air entering said crankcase comprising, a fuel valve, a fuel flow orifice thereof, an adjustable needle for basically setting the size of said flow orifice, a bellows having one side exposed to the atmosphere, the other side exposed to the absolute pressure within said fresh air intake duct, one end thereof being free to expand and contract longitudinally, the other fixed to said air intake duct, the fixed end carrying said orifice, the free end carrying said needle, a throttle valve controlling said fresh air intake to said engine, said bellows mounted between said throttle and said engine, the atmospheric pressure plus a partial vacuum existing in varying degrees when the engine is running, tending varyingly to close said fuel orifice by movement of the needle, the elasticity of said bellows tending to open said fuel orifice by opposite movement of said needle.

References Cited in the file of this patent

UNITED STATES PATENTS

| | | |
|---|---|---|
| Re. 15,832 | Edwards | May 6, 1924 |
| 1,745,493 | Kratzer | Feb. 4, 1930 |
| 2,030,732 | Angel | Feb. 11, 1936 |
| 2,053,338 | Kahn | Sept. 8, 1936 |
| 2,055,352 | Kahn | Sept. 22, 1936 |
| 2,304,694 | Kammer | Dec. 8, 1942 |
| 2,362,700 | Kirtland et al. | Nov. 14, 1944 |
| 2,491,693 | Sivertsen | Dec. 20, 1949 |
| 2,512,909 | Beaven | June 27, 1950 |

FOREIGN PATENTS

| | | |
|---|---|---|
| 818,526 | France | June 21, 1937 |

OTHER REFERENCES

"Internal Combustion Engines" (Lichty), published by McGraw-Hill Book Co. (New York), 1939.

"Internal Combustion Engines" (Lichty), published by McGraw-Hill Book Co. (New York), 1951.